(12) United States Patent
Wang et al.

(10) Patent No.: US 9,170,443 B2
(45) Date of Patent: Oct. 27, 2015

(54) LIQUID CRYSTAL DISPLAY DEVICE

(71) Applicant: Shenzhen China Star Optoelectronics Technology Co., LTD., Shenzhen, Guangdong Province (CN)

(72) Inventors: Jiaqiang Wang, Shenzhen (CN); Shihhsiang Chen, Shenzhen (CN)

(73) Assignee: SHENZHEN CHINA STAR OPTOELECTRONICS TECHNOLOGY CO., LTD., Shenzhen, Guangdong Province (CN)

( * ) Notice: Subject to any disclaimer, the term of this patent is extended or adjusted under 35 U.S.C. 154(b) by 115 days.

(21) Appl. No.: 13/703,896

(22) PCT Filed: Oct. 9, 2012

(86) PCT No.: PCT/CN2012/082599
§ 371 (c)(1),
(2) Date: Dec. 12, 2012

(87) PCT Pub. No.: WO2014/040323
PCT Pub. Date: Mar. 20, 2014

(65) Prior Publication Data
US 2014/0071375 A1    Mar. 13, 2014

(30) Foreign Application Priority Data

Sep. 11, 2012    (CN) .......................... 2012 1 0334465

(51) Int. Cl.
*G02F 1/1333*    (2006.01)
*G02F 1/1335*    (2006.01)

(52) U.S. Cl.
CPC ........ *G02F 1/1333* (2013.01); *G02F 1/133608* (2013.01); *G02F 2001/133322* (2013.01); *G02F 2201/503* (2013.01)

(58) Field of Classification Search
CPC .................. G02F 1/1333; G02F 2001/133314; G02F 2001/13332; G02F 2001/133322
USPC .................... 349/58, 60; 361/679.26, 679.29; 455/566, 575.1–575.9
See application file for complete search history.

(56) References Cited

U.S. PATENT DOCUMENTS 6,507,377 B1 * 1/2003 Jung .............................. 349/60
2001/0036057 A1 * 11/2001 Fukuyoshi .................... 361/681

(Continued)

FOREIGN PATENT DOCUMENTS

CN    201359237 Y    12/2009
CN    201359672 Y    12/2009

(Continued)

*Primary Examiner* — Michael Caley
(74) *Attorney, Agent, or Firm* — Cheng-Ju Chiang (57) ABSTRACT

The present invention provides a liquid crystal display device, which includes an enclosure and a liquid crystal display module received in the enclosure. The enclosure has a sidewall corresponding to the liquid crystal display module and including resilient retention structures mounted thereto to retain the liquid crystal display module in the enclosure. The liquid crystal display device according to the present invention uses the resilient retention structures that are arranged at mounting sites between a front case or a rear case and a liquid crystal display module for retaining the liquid crystal display module in position, whereby when the liquid crystal display module expands/contracts due to humid and hot environment or is acted upon by external impacts, the resilient retention structures undergo corresponding elastic deformation to provide effective cushioning and adjustment so as to ensure the optic grade of the liquid crystal display device.

6 Claims, 8 Drawing Sheets

(56) References Cited

U.S. PATENT DOCUMENTS

| | | | |
|---|---|---|---|
| 2003/0046849 A1* | 3/2003 | Lin | 40/792 |
| 2006/0034041 A1* | 2/2006 | Lo et al. | 361/681 |
| 2006/0221265 A1* | 10/2006 | Chen et al. | 348/825 |
| 2010/0101131 A1* | 4/2010 | Lipczynski | 40/745 |

FOREIGN PATENT DOCUMENTS

| | | |
|---|---|---|
| CN | 201392440 Y | 1/2010 |
| JP | 2003-84263 A | 3/2003 |
| JP | 2005-189597 A | 7/2005 |

* cited by examiner

LIQUID CRYSTAL DISPLAY DEVICE

BACKGROUND OF THE INVENTION

1. Field of the Invention

The present invention relates to the field of liquid crystal displaying, and in particular to a liquid crystal display device.

2. The Related Arts

Liquid crystal display (LCD) has a variety of advantages, such as thin device body, low power consumption, and being free of radiation, and is thus widely used. Most of the LCDs that are currently available in the market are backlighting TFT-LCDs (Thin-Film Transistor LCDs), which comprise a liquid crystal panel and a backlight module. The working principle of the liquid crystal panel is that liquid crystal polymer molecules interposed between two parallel pieces of glass and numerous vertical and horizontal fine electrical wires are arranged between the two pieces, whereby the liquid crystal molecules are controlled to change direction by application of electricity in order to refract light emitting from the backlight module for generating images.

The constant development of liquid crystal displaying technology makes the liquid crystal display device that is advantageous in respect of being thin and light and having lower power consumption and low radiation increasingly replace the traditionally used CRT (Cathode Ray Tube) displays.

Figure 1:
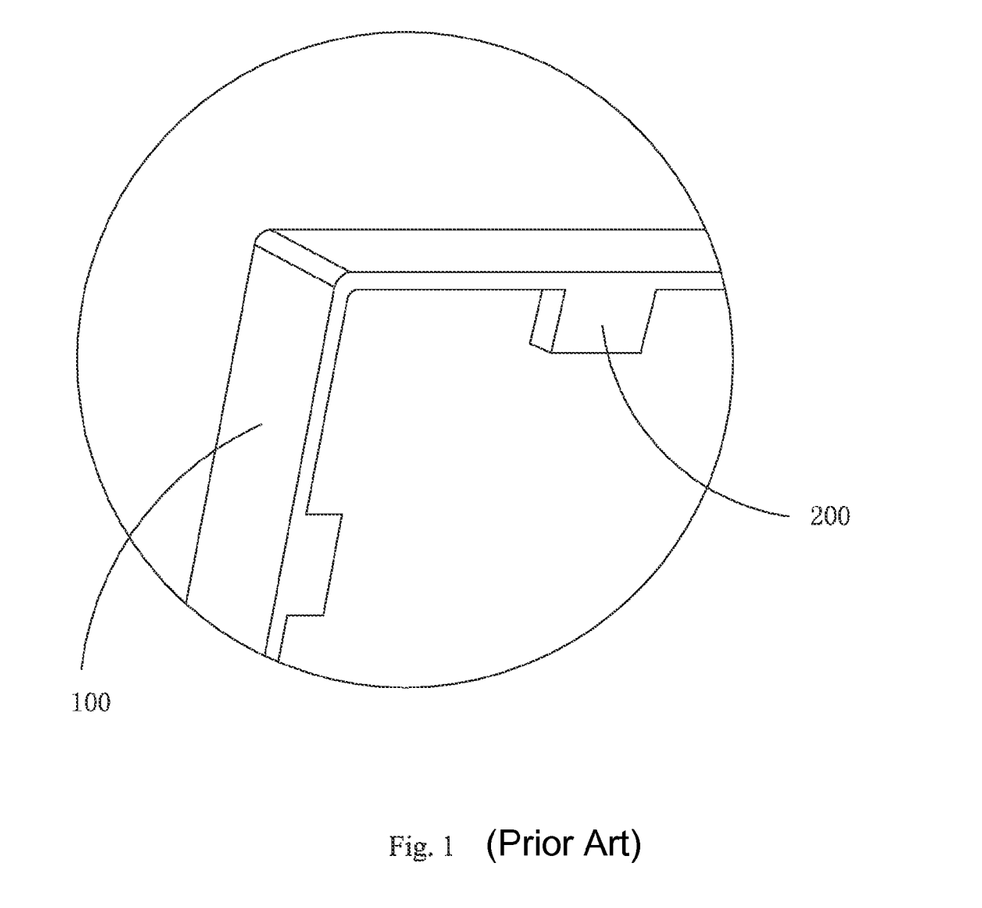
FIG. 1 is a schematic view showing a conventional retention device for liquid crystal display device.

As shown in FIG. 1, a schematic view showing a portion of an assembling structure of a conventional liquid crystal display device is given. The liquid crystal display device has a front case or a rear case having a side plate 100 on which a retention structure 200 is formed. The retention structure 200 provides only an effect of retaining a liquid crystal display module of the liquid crystal display device. The conventional retention structure 200 cannot provide protection to the liquid crystal display module when the display module expands/contracts due to an external humid and hot environment or is impacted by an external force. The optic grade of the liquid crystal display module will be thus affected.

SUMMARY OF THE INVENTION

An object of the present invention is to provide a liquid crystal display device, which comprises resilient retention structure provided at a mounting site between a front case or rear case and a liquid crystal display module, whereby when the liquid crystal display module is subjected to an external impact, the resilient retention structure provides effective cushioning and adjustment so as to ensure the optic grade of the liquid crystal display device.

To achieve the objects, the present invention provides a liquid crystal display device, which comprises an enclosure and a liquid crystal display module received in the enclosure. The enclosure has a sidewall corresponding to the liquid crystal display module and comprising resilient retention structures mounted thereto to retain the liquid crystal display module in the enclosure.

The enclosure comprises a front case and a rear case mating the front case.

The rear case comprises a bottom plate and a first side plate connected to the bottom plate. The first side plate and the bottom plate define a first receiving space. The liquid crystal display module is received in the first receiving space.

The resilient retention structures each comprise a first extension section extending upward from the bottom plate and a first retention section connected to the first extension section. The first retention section extends from an end of the first extension section that is distant from the bottom plate in a direction toward the liquid crystal display module.

The resilient retention structures each comprise a first strengthening section. The first strengthening section has an end connected to the first extension section and an opposite end connected to the first side plate.

The resilient retention structures each comprise a second extension section extending from the first side plate toward the liquid crystal display module, a second retention section extending upward from an end of the second extension section that is distant from the first side plate, and a second strengthening section connected to both the second extension section and the first side plate.

The resilient retention structures each comprise a protrusion section formed on the first side plate and a third retention section extending from the protrusion section toward the liquid crystal display module.

The protrusion section is in the form of an arch bridge, which comprises a bridge floor facing the liquid crystal display module and connection sections connecting the bridge floor and the first side plate. An opening is formed on the bridge floor. The third retention section extends from one side of the opening that is adjacent to the bottom plate in a direction toward the liquid crystal display module.

The front case comprises a top plate and a second side plate connected to the top plate. The second side plate and the top plate define a second receiving space. The liquid crystal display module is received in the second receiving space.

The resilient retention structures are mounted to the top plate or the second side plate.

The present invention also provides a liquid crystal display device, which comprises an enclosure and a liquid crystal display module received in the enclosure, the enclosure having a sidewall corresponding to the liquid crystal display module and comprising resilient retention structures mounted thereto to retain the liquid crystal display module in the enclosure;

wherein the enclosure comprises a front case and a rear case mating the front case;

wherein the rear case comprises a bottom plate and a first side plate connected to the bottom plate, the first side plate and the bottom plate defining a first receiving space, the liquid crystal display module being received in the first receiving space;

wherein the resilient retention structures each comprise a first extension section extending upward from the bottom plate and a first retention section connected to the first extension section, the first retention section extending from an end of the first extension section that is distant from the bottom plate in a direction toward the liquid crystal display module; and wherein the resilient retention structures each comprise a first strengthening section, the first strengthening section having an end connected to the first extension section and an opposite end connected to the first side plate.

The efficacy of the present invention is that the present invention provides a liquid crystal display device, which comprises resilient retention structures arranged at mounting sites between a front case or a rear case and a liquid crystal display module for retaining the liquid crystal display module of the liquid crystal display device, whereby when the liquid crystal display module of the liquid crystal display device expands/contracts due to humid and hot environment or is acted upon by external impacts, the resilient retention structures undergo corresponding elastic deformation to provide effective cushioning and adjustment so as to ensure the optic grade of the liquid crystal display device.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 2:
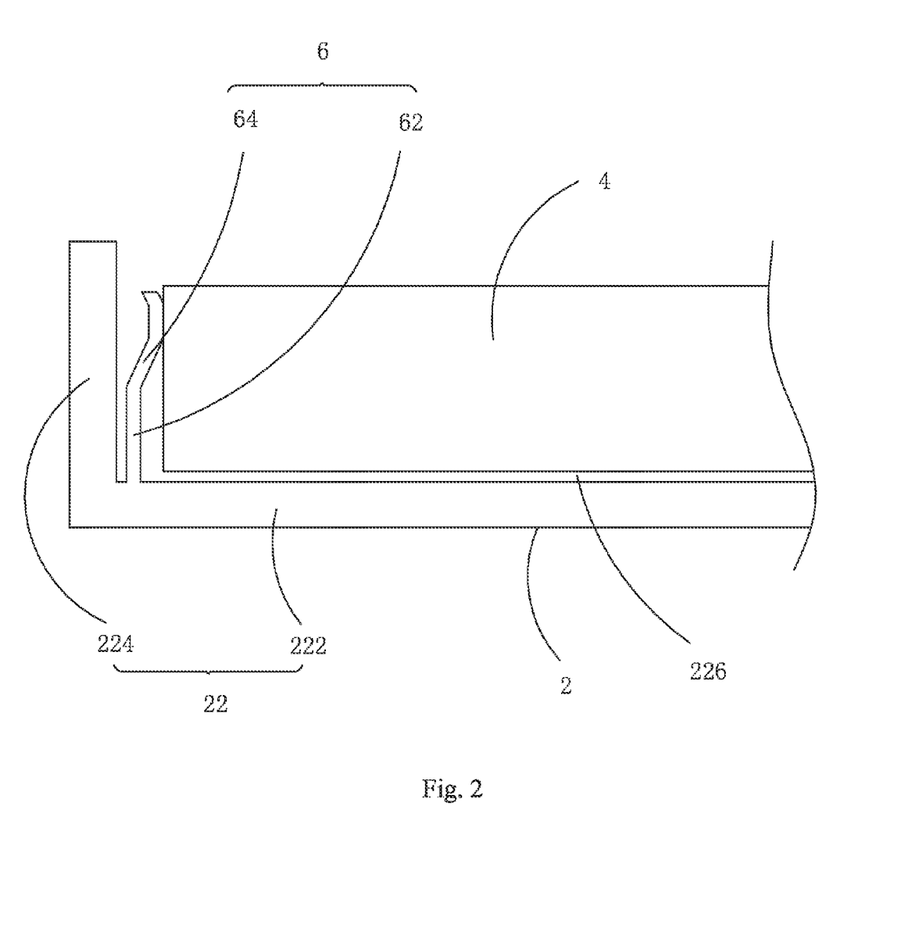
FIG. 2 is a schematic view showing a liquid crystal display device according to a first embodiment of the present invention.
Figure 3:
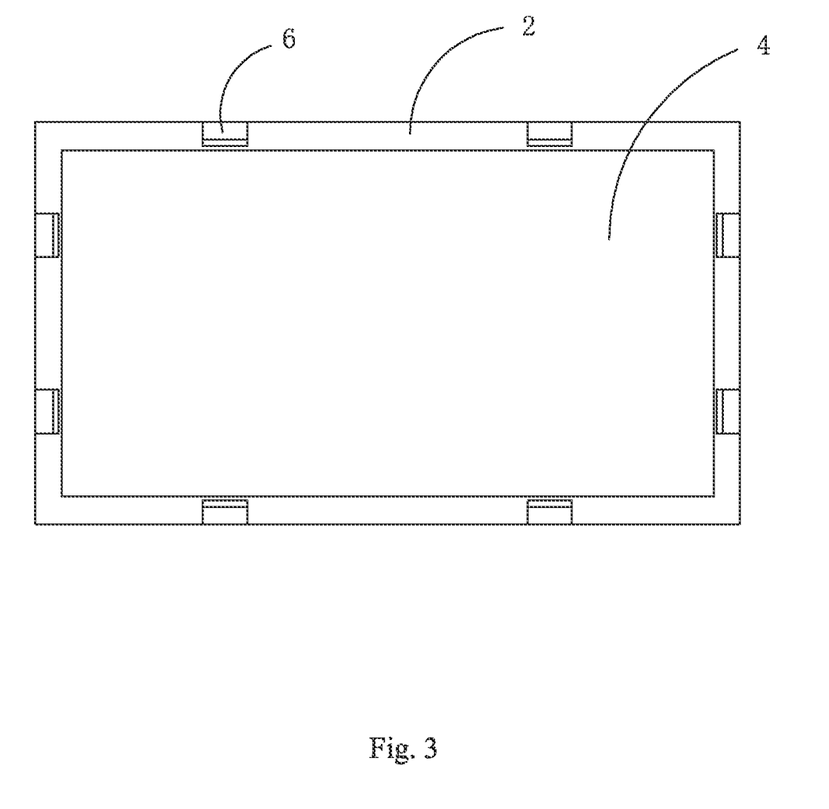
FIG. 3 is a top plan view showing the arrangement of resilient retention structures distributed in the liquid crystal display device according to the present invention.

Referring to FIGS. 2 and 3, the present invention provides a liquid crystal display device, which comprises an enclosure 2 and a liquid crystal display module 4 received in the enclosure 2. The enclosure 2 has a sidewall corresponding to the liquid crystal display module 4 and comprising resilient retention structures 6 mounted thereto to retain the liquid crystal display module 4 in the enclosure 2.

The enclosure 2 comprises a front case (not shown) and a rear case 22 mating the front case. The rear case 22 comprises a bottom plate 222 and a first side plate 224 connected to the bottom plate 222. The first side plate 224 and the bottom plate 222 define a first receiving space 226 and the liquid crystal display module 4 is received in the first receiving space 226.

The resilient retention structures 6 each comprise a first extension section 62 extending upward from the bottom plate 222 and a first retention section 64 connected to the first extension section 62. The first retention section 64 extends from an end of the first extension section 62 that is distant from the bottom plate 222 in a direction toward the liquid crystal display module 4.

In assembling, the resilient retention structures 6 receive a depressing force from the liquid crystal display module 4 and the resilient retention structures 6 undergo elastic deformation to thereby generate a spring force. The spring force is transmitted through the first retention section 64 to act on the liquid crystal display module 4 thereby retaining the liquid crystal display module 4 in the first receiving space 226. When the liquid crystal display module 4 expands/contracts due to a humid and hot environment or is vibrated by an external force, the resilient retention structures 6 undergo a corresponding elastic deformation so as to maintain the first retention section 64 in tight engagement with a side of the liquid crystal display module 4 thereby providing an effect of cushioning and ensuring the optic grade of the liquid crystal display module 4 not affected.

The resilient retention structures 6 are arranged on upper, lower, left, and right sides of the rear case 22 and are of a number that is determined according to the model thereof. Preferably, each side is provided with two resilient retention structures 6.

Figure 4:
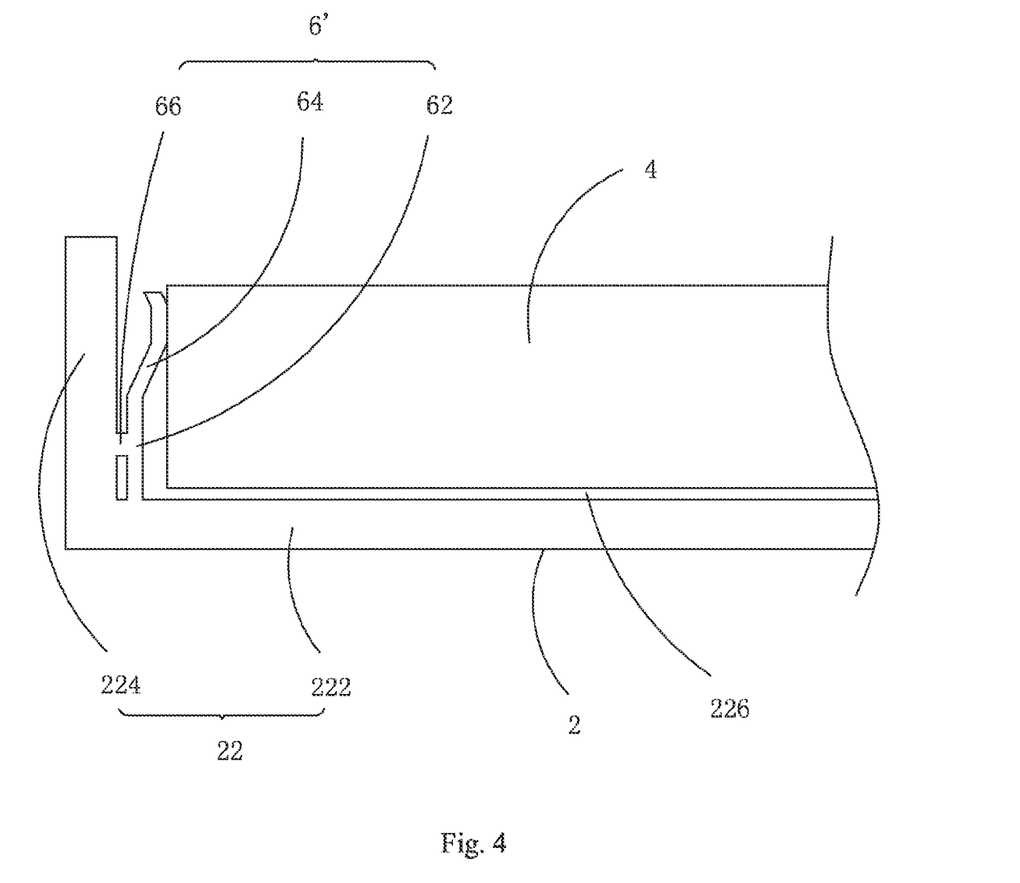
FIG. 4 is a schematic view showing a liquid crystal display device according to a second embodiment of the present invention.

Referring to FIG. 4, a schematic view showing a liquid crystal display device according to a second embodiment is given. In the instant embodiment, the resilient retention structures 6' each comprise a first strengthening section 66. The first strengthening section 66 has an end connected to the first extension section 62 and an opposite end connected to the first side plate 224 in order to improve the strength of the resilient retention structure 6' and extend service life thereof.

Figure 5:
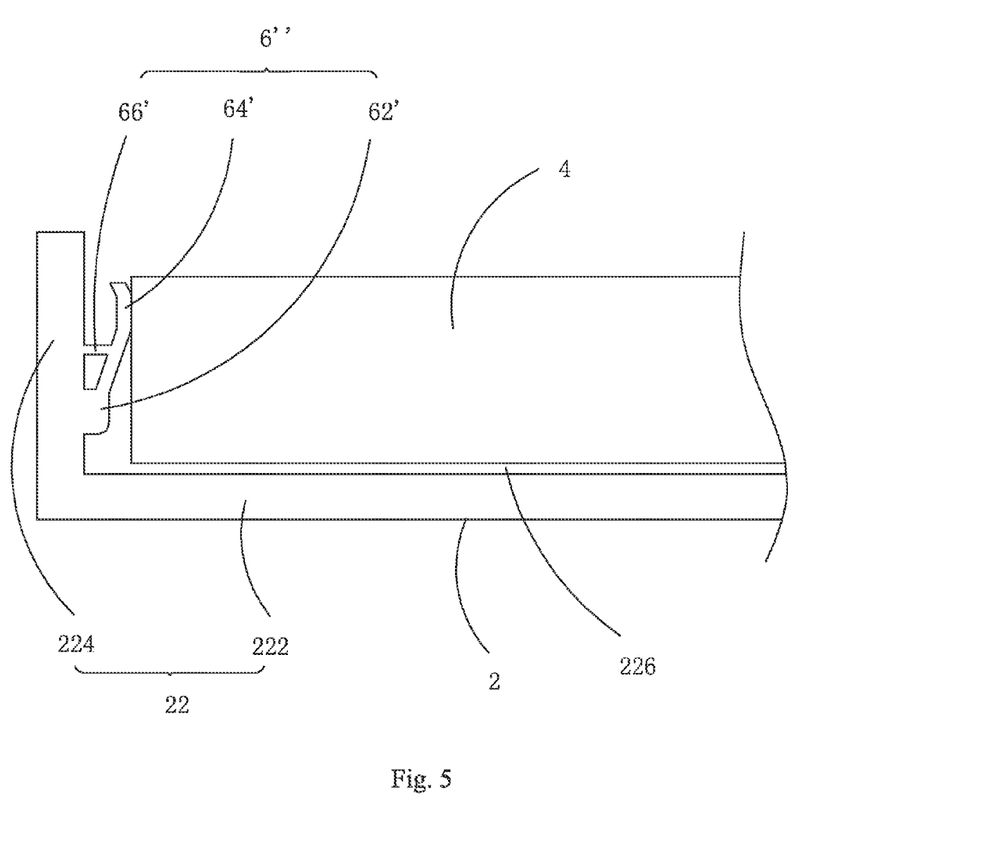
FIG. 5 is a schematic view showing a liquid crystal display device according to a third embodiment of the present invention.

Referring to FIG. 5, schematic view showing a liquid crystal display device according to a third embodiment is given. In the instant embodiment, the resilient retention structures 6" each comprise a second extension section 62' extending from the first side plate 224 toward the liquid crystal display module, a second retention section 64' extending upward from an end of the second extension section 62' that is distant from the first side plate 224, and a second strengthening section 66' connected to both the second extension section 62' and the first side plate 224. The instant embodiment provides the same technical effect as that of the previous embodiments.

Figure 6:
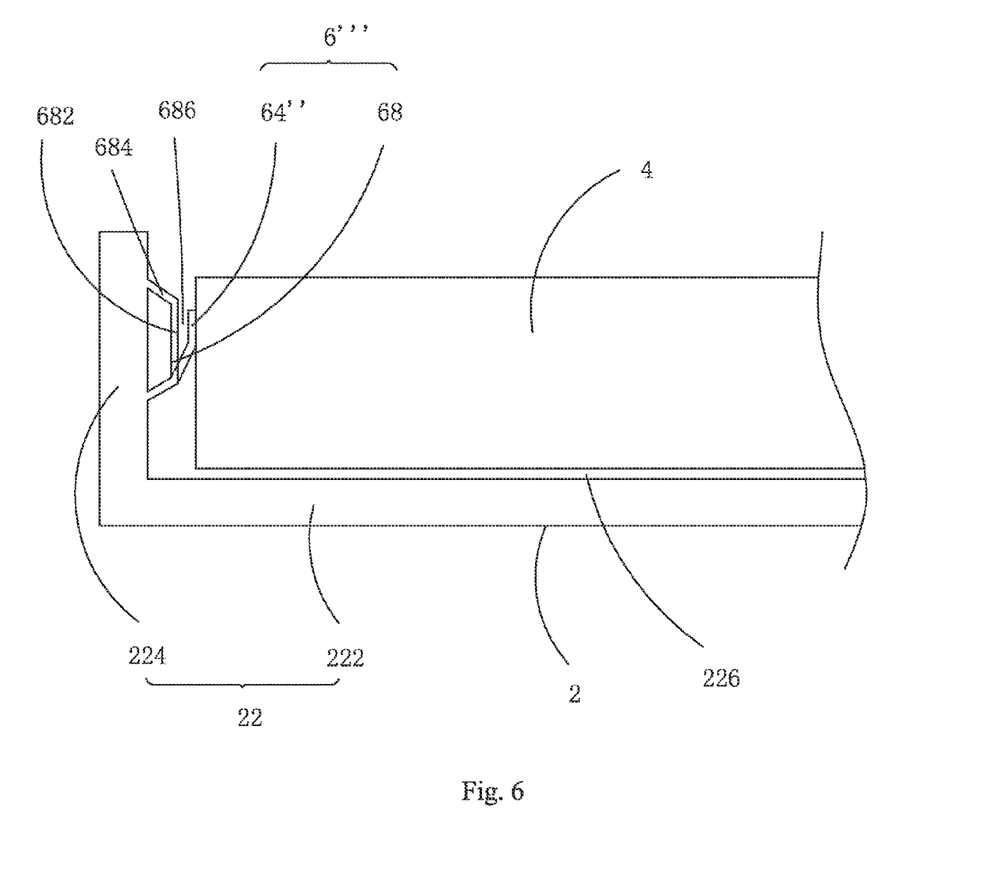
FIG. 6 is a schematic view showing a liquid crystal display device according to a fourth embodiment of the present invention.

Referring to FIG. 6, a schematic view showing a liquid crystal display device according to a fourth embodiment is given. In the instant embodiment, the resilient retention structures 6'''each comprise a protrusion section 68 formed on the first side plate 224 and a third retention section 64'' extending from the protrusion section 68 toward the liquid crystal display module 4. The protrusion section 68 is in the form of an arch bridge, which comprises a bridge floor 682 facing the liquid crystal display module 4 and connection sections 684 connecting the bridge floor 682 and the first side plate 224. An opening 686 is formed on the bridge floor 682. The third retention section 64'' extends from one side of the opening 686 that is adjacent to the bottom plate 222 in a direction toward the liquid crystal display module 4. The instant embodiment provides the same technical effect as that of the previous embodiments.

Figure 7:
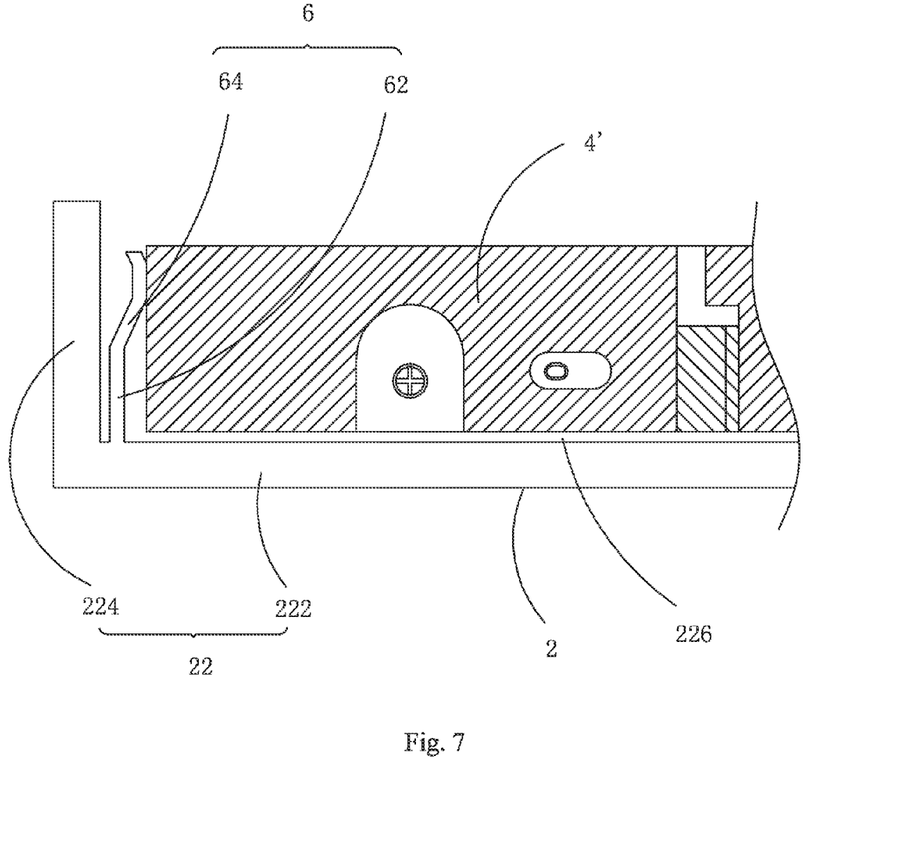
FIG. 7 is a schematic view showing a liquid crystal display device according to a fifth embodiment of the present invention.

Referring to FIG. 7, a schematic view showing a liquid crystal display device according to a fifth embodiment is given. In the instant embodiment, the resilient retention structures 6 each comprise a first extension section 62 extending upward from the bottom plate 222 and a first retention section 64 connected to the first extension section 62. The first retention section 64 extends from an end of the first extension section 62 that is distant from the bottom plate 222 in a direction toward the liquid crystal display module 4'. The module 4' is an extendible/retractable module. The instant embodiment provides the same technical effect as that of the previous embodiments.

Figure 8:
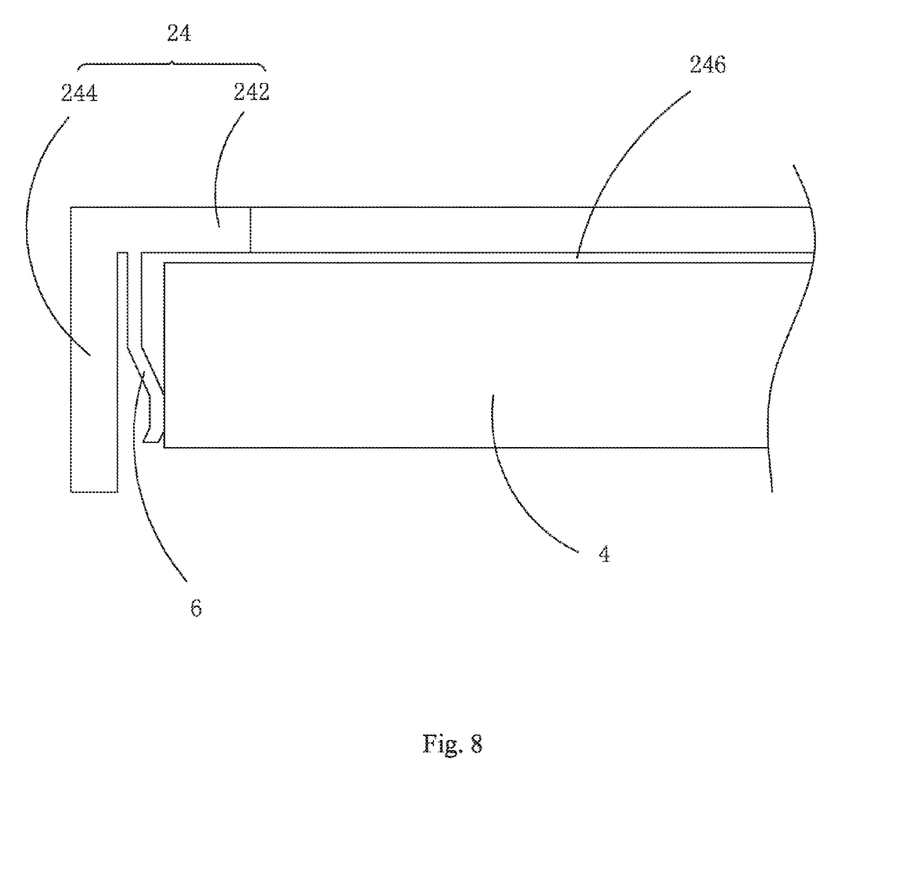
FIG. 8 is a schematic view showing a liquid crystal display device according to a sixth embodiment of the present invention n.

It is noted that, as shown in FIG. 8, the liquid crystal display module 4 can be alternatively mounted inside the front case 24. The front case 24 comprises a top plate 242 and a second side plate 244 connected to the top plate 242. The second side plate 244 and the top plate 242 define a second receiving space 246. The liquid crystal display module 4 is received in the second receiving space 246. The resilient retention structures 6 are mounted to the top plate 242 or the second side plate 244. A specific arrangement of the resilient retention structures 6 mounted to the front case 24 can be one that is similar to what described in the previous embodiments for mounting the resilient retention structures 6 to the front case 24 and provides the same technical effect. Repeated description will be omitted here.

In summary, the present invention provides a liquid crystal display device, which comprises resilient retention structures arranged at mounting sites between a front case or a rear case and a liquid crystal display module for retaining the liquid crystal display module of the liquid crystal display device, whereby when the liquid crystal display module of the liquid crystal display device expands/contracts due to humid and hot environment or is acted upon by external impacts, the resilient retention structures undergo corresponding elastic deformation to provide effective cushioning and adjustment so as to ensure the optic grade of the liquid crystal display device.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal display device, comprising an enclosure and a liquid crystal display module received in the enclosure, the enclosure having a sidewall corresponding to the liquid crystal display module and comprising resilient retention structures mounted thereto to retain the liquid crystal display module in the enclosure;

wherein each of the resilient retention structures comprises a spring arm in a cantilever form and having a first end fixed and a second end that is distant from the first end and free, the second end comprising a smooth surface for being resiliently and directly engageable with a side face of the liquid crystal display module and thus applying a spring force to the side face of the liquid crystal display module through elastic deformation of the each resilient retention structure to thereby retain the liquid crystal display module in position in the enclosure;

wherein the enclosure comprises a front case and a rear case mating the front case;

wherein the rear case comprises a bottom plate and a first side plate connected to the bottom plate, the first side plate and the bottom plate defining a first receiving space, the liquid crystal display module being received in the first receiving space;

wherein each of the resilient retention structures comprises a protrusion section formed on and fixed to the first side plate and a third retention section in a cantilever form and extending from the protrusion section and curved toward the liquid crystal display module to form the smooth surface to engage the side face of the liquid crystal display module; and wherein the protrusion section is in the form of an arch bridge, which comprises a bridge floor facing the liquid crystal display module and connection sections respectively connecting opposite ends of the bridge floor to the first side plate, an opening being formed on the bridge floor, the third retention section extending from one side of the opening that is adjacent to the bottom plate in a direction toward the liquid crystal display module.

2. A liquid crystal display device, comprising an enclosure and a liquid crystal display module received in the enclosure, the enclosure having a sidewall corresponding to the liquid crystal display module and comprising a resilient retention structure mounted thereto to engage and retain the liquid crystal display module in the enclosure, the resilient retention structure comprising a protrusion section in the form of an arch bridge, which comprises a bridge floor facing the liquid crystal display module and connection sections respectively connecting opposite ends of the bridge floor to the sidewall of the enclosure, a retention section in a cantilever form extending from the arch bridge of the protrusion section with an opening formed between the retention section and the bridge floor, the retention section extending in a direction toward the liquid crystal display module to resiliently engage the liquid crystal display module.

3. The liquid crystal display device as claimed in claim 2, wherein the enclosure comprises a front case and a rear case mating the front case.

4. The liquid crystal display device as claimed in claim 3, wherein the rear case comprises a bottom plate and a side plate connected to the bottom plate, the sidewall of the enclosure being constituted partly by the side plate, the side plate and the bottom plate defining a receiving space to receive the liquid crystal display module therein, the resilient retention structure being formed on the side plate to allow the retention section to engage the liquid crystal display module.

5. The liquid crystal display device as claimed in claim 3, wherein the front case comprises a top plate and a side plate connected to the top plate, the sidewall of the enclosure being constituted partly by the side plate, the side plate and the bottom plate defining a receiving space to receive the liquid crystal display module therein, the resilient retention structure being formed on the side plate to allow the retention section to engage the liquid crystal display module.

6. The liquid crystal display device as claimed in claim 3, wherein the front case comprises a top plate and a side plate connected to the top plate, the sidewall of the enclosure being constituted partly by the top plate, the side plate and the top plate defining a receiving space to receive the liquid crystal display module therein, the resilient retention structure being formed on the top plate to allow the retention section to engage the liquid crystal display module.

* * * * *